Jan. 7, 1930.　　　　E. BERG　　　　1,742,571

BATTERY TERMINAL

Filed April 11, 1928

Inventor

Elmer Berg,

By Clarence A. O'Brien
Attorney

Patented Jan. 7, 1930

1,742,571

UNITED STATES PATENT OFFICE

ELMER BERG, OF ST. JAMES, MINNESOTA

BATTERY TERMINAL

Application filed April 11, 1928. Serial No. 269,170.

The present invention relates to battery terminals and has for its principal object to provide a device of this character in which a wedge member is utilized for forming a gripping engagement between the terminal and the battery post.

A further object of the invention is to provide means for securing the wedge member in a fixed position for forming a positive connection between the terminal and the battery post.

A still further object is to provide a device of this character of a simple and practical construction, which is strong and durable, easy to install and replace in position with respect to the battery and relatively inexpensive to manufacture as well as otherwise being well adapted for the purposes for which the same is intended.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 1:
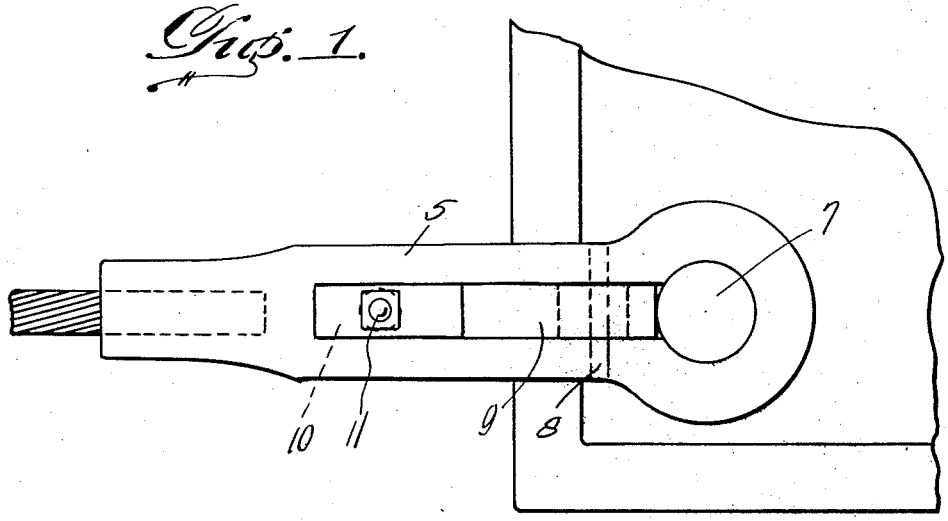
Figure 1 is a top plan view.

Referring now to the drawing in detail, the invention comprises a battery terminal composed of a relatively elongated metallic body 5 having one end formed with an inwardly extending recess for receiving the battery feed wire 6, which is soldered or otherwise secured to the body and having its other end formed with an opening through which the battery post 7 may be inserted.

Figure 2:
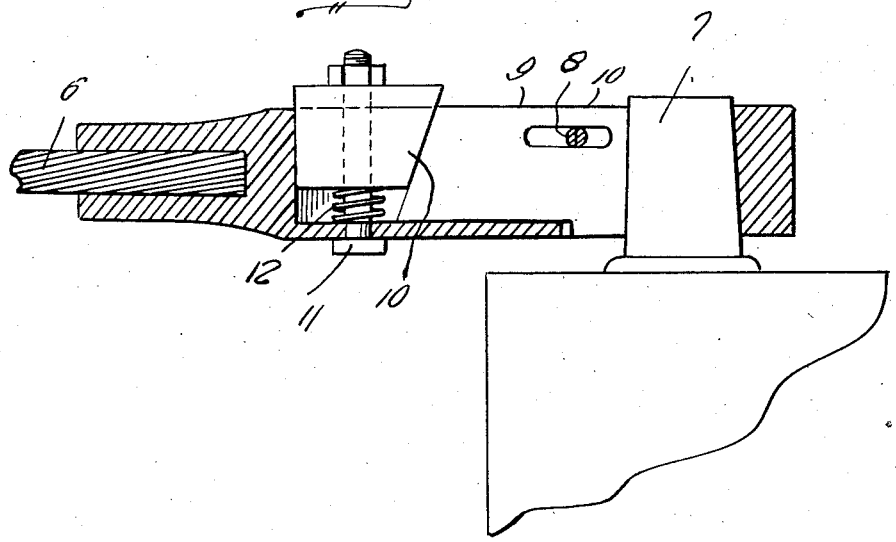
Figure 2 is a longitudinal vertical sectional view.

The body portion between the end of the cable 6 and the opening for receiving the battery post 7 is hollow as clearly shown in Figure 2 of the drawings, said hollow portion communicating with the opening for the battery post and having a pin 8 extending transversely of the hollow portion of the body and disposed in a horizontal position. A wedge member 9 is arranged in the hollow portion of the body with a slotted opening 10 formed therein through which the pin 8 is inserted, one end of said wedge member being disposed in abutting relation with the battery post 7 and the opposite end of said wedge member being extended in a direction toward the opposite end of the hollow portion of the body.

The end of the wedge member 9 remote from the battery post 7 is inclined vertically as shown in Figure 2 of the drawing and adapted for engagement by the oppositely inclined edge of a wedge member 10 fitted in the end of the hollow portion of the body remote from the battery post. The body 5 and the wedge member 10 is formed with an alined opening through which a bolt 11 is threadedly inserted and adapted upon being tightened in the body to force the oppositely inclined edges of the wedge members 9 and 10 against each other.

The bolt 11 also forces the wedge member 9 into a tightly gripping engagement with the post 7. The hollow portion of the body 5 is open upwardly adjacent the post 7 so as to permit the fitting of the wedge members within the interior of the body, the pin 8 serving to prevent the accidental removal of the wedge members after the same have been assembled in position therein.

A coil spring 12 is also carried on the bolt 11 whereby to yieldably receive the tightening force of the nut end of the bolt and provide a yieldable engagement between the wedge members. It is apparent the terminal may be easily and quickly secured in position with respect to the battery post by releasing or tightening the bolt 11 so as to adjust the wedge members in the interior of the body.

It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

1. A battery terminal comprising a body portion having a cable connected at one end thereof and an opening formed at its opposite end adapted to receive the battery post, said body being of a hollow construction with the hollow portion thereof communicating with the opening for the post, a pair of wedge members arranged within the hollow portion of the body, one of said members being engageable in wedging relation with the battery post, and means carried by the body for forcing the other of said wedge members into wedging engagement with the first named wedge member.

2. A battery terminal comprising a body having a cable connection at one end and an opening formed in its opposite end adapted to receive the battery post, said body being of a hollow formation with the hollow portion thereof communicating with the post opening, a battery post engaging wedge slidably carried in the hollow portion of the body, a pin carried by the body and engaging said wedge whereby to provide for the horizontal sliding movement thereof, said wedge having one end engageable with the battery post, a second wedge engageable with the opposite end of said first named wedge and a bolt carried by the body and threaded through said last named wedge and adapted upon the tightening thereof to force said first named wedge into engagement with the battery post.

3. A battery terminal comprising a body portion having a cable connected at one end thereof and an opening formed at its opposite end adapted to receive the battery post, said body being of a hollow construction with the hollow portion thereof communicating with the opening for the post, a pair of wedge members disposed within the body and having interengageable wedge faces and cooperating to secure the body upon the battery post, and means carried by the body for adjusting the members relative to each other.

In testimony whereof I affix my signature.

ELMER BERG.